(12) United States Patent
Jing

(10) Patent No.: US 11,003,023 B2
(45) Date of Patent: May 11, 2021

(54) DYNAMIC LIGHT-MIXING METHOD OF BACKLIGHT MODULE

(71) Applicant: Huizhou China Star Optoelectronics Technology Co., Ltd., Huizhou (CN)

(72) Inventor: Xiaohong Jing, Huizhou (CN)

(73) Assignee: HUIZHOU CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 392 days.

(21) Appl. No.: 16/097,621

(22) PCT Filed: Sep. 18, 2018

(86) PCT No.: PCT/CN2018/106343
§ 371 (c)(1),
(2) Date: Oct. 30, 2018

(87) PCT Pub. No.: WO2019/214129
PCT Pub. Date: Nov. 14, 2019

(65) Prior Publication Data
US 2021/0080788 A1    Mar. 18, 2021

(30) Foreign Application Priority Data
May 9, 2018   (CN) .......................... 201810439397.2

(51) Int. Cl.
*G02F 1/13357*   (2006.01)
*G02F 1/1335*    (2006.01)

(52) U.S. Cl.
CPC .. *G02F 1/133609* (2013.01); *G02F 1/133603* (2013.01); *G02F 1/133613* (2021.01)

(58) Field of Classification Search
CPC .................................. G02F 1/133602–133612
See application file for complete search history.

(56) References Cited

FOREIGN PATENT DOCUMENTS

| CN | 203980000 U |   | 12/2014 |
|---|---|---|---|
| CN | 104763923 A | * | 7/2015 |
| CN | 104933995 A |   | 9/2015 |
| CN | 105158978 A | * | 12/2015 |
| CN | 105845088 A | * | 8/2016 |
| CN | 105845088 A |   | 8/2016 |
| CN | 105869578 A |   | 8/2016 |
| CN | 109407408 A | * | 3/2019 |
| CN | 109785802 A | * | 5/2019 |
| JP | 2008034267 A |   | 2/2008 |
| KR | 20120060425 A | * | 6/2012 |

* cited by examiner

*Primary Examiner* — Mariceli Santiago
(74) *Attorney, Agent, or Firm* — Leong C. Lei

(57) ABSTRACT

A dynamic light-mixing method of backlight module is disclosed. Through periodically reciprocating a backlight source (11) with single lamp package to compensate for an insufficient light region, each time a reciprocating movement is completed, the light-emitting region (LF) sweeps through all light-emitting surfaces of the backlight module (1) once, and the period of the reciprocating movement is smaller than the time resolution of the human eye, so that the light emitted by the backlight source (11) with single lamp package can achieve an uniform light-mixing effect in the reaction time of the human eye, and meets the requirements for optical uniformity of the entire backlight module (1).

5 Claims, 6 Drawing Sheets

DYNAMIC LIGHT-MIXING METHOD OF BACKLIGHT MODULE

FIELD OF THE INVENTION

The present invention relates to the field of liquid crystal display technology, and in particular, to a dynamic light-mixing method of backlight module.

BACKGROUND OF THE INVENTION

Liquid Crystal Display (LCD) has many advantages such as thin body, power saving, no radiation, etc., so that the LCD has been widely applied in devices such as: LCD TV, mobile phone, personal digital assistant (PDA), digital camera, computer screen or laptop screens, etc.

Most of the liquid crystal displays on the market are backlight type liquid crystal display devices, which include a case, a liquid crystal panel disposed in the case and a backlight module disposed in the case.

The structure of the liquid crystal panel is formed by a color filter substrate (CF), a thin film transistor array substrate (TFT Array Substrate), and a liquid crystal layer disposed between the two substrates. The liquid crystal panel does not emit light itself, and the working principle of the liquid crystal panel is to control the rotation of the liquid crystal molecules of the liquid crystal layer by applying a driving voltage on the two glass substrates, and refract the light of the backlight module to generate a picture.

The backlight module is divided into a side-light backlight module and a direct-light backlight module according to different incident positions of the backlight source. The direct-light type backlight module is provided with a backlight source such as a cathode fluorescent lamp (CCFL) or a light emitting diode (LED) light bar, which is disposed behind the liquid crystal panel to directly form a surface light source and providing to the LCD panel. The side-light backlight module is provided with a backlight LED strip disposed at an edge of a back plate behind the liquid crystal panel, and the light emitted by the LED strip enters a light-incident surface of the light guide plate (LGP). After being reflected and diffused, the light is emitted from the light-emitting surface of the light guide plate, passes through the optical film group, and finally forms a surface light source to be supplied to the liquid crystal panel.

With the popularity of large-size LCD TV, users have gradually increased the demand for light-weight and simplified structure of a backlight module. However, most of the current direct-light backlight module is assembled using a plurality of light bars, and the assembly and wire insertion and cable management processes are complicated; the side-light backlight module has an overall weight increase of the backlight module due to the need to provide a light guide plate. Accordingly, a single LED package (ONE LED Package) backlight is provided to simplify the assembly process of the backlight module and reduce the weight of the backlight module.

In the prior art, there is a significant problem in the backlight source with single LED package: as shown in FIG. 1 to FIG. 3 and FIG. 4 to FIG. 6, the light mixing distance OD of the backlight module 100 is low (the thinner the LCD module, the lower the OD value), it is difficult to achieve optical uniformity of the backlight: if the backlight source 101 with single LED package is symmetrical, as shown in FIG. 1 to FIG. 3, since the light-emitting region LF of the backlight source 101 with single LED package is limited, the short edge direction of the backlight module 100 can meet the requirement of optical uniformity, and in the long edge direction of the backlight module 100, only the backlight in a portion of the region (the portion indicated by the double-dash line frame in FIG. 1) can be made uniform, so that the optical uniformity of the entire backlight module cannot be satisfied, and the more complex structures or auxiliary optics can improve optical uniformity.

If the backlight source 101 with single LED package is asymmetric, as shown in FIG. 4 to FIG. 6, since the light emitting region LF of the backlight source 101 with single LED package is limited, only the upper right part of the backlight module 100, similar to the fan-like region (the part indicated by the double-dash line frame in FIG. 4), is uniform, so that the optical uniformity of the entire backlight module cannot be satisfied, and a relatively complicated structure or auxiliary optics is required to improve the optical uniformity.

SUMMARY OF THE INVENTION

The object of the present invention is to provide a dynamic light mixing method of backlight module, which can make the light emitted by the backlight source with single lamp package to be uniformly mixed in the reaction time of the human eye, and satisfy the optical uniformity of the entire backlight module.

In order to realize the above purpose, the present invention provides a dynamic light-mixing method of backlight module, comprising steps of: step S1: providing a liquid crystal display, and the liquid crystal display includes a backlight module, wherein the backlight module is provided with a backlight source with single lamp package; step S2: periodically reciprocating the backlight source with single lamp package to perform a light-mixing, and a period of a reciprocating movement is smaller than a time resolution of a human eye; wherein each time the backlight source with single lamp package completes a reciprocating movement, a light-emitting region of the backlight source sweeps through all light-emitting surface of the backlight module once.

Preferably, the backlight source with single lamp package is a backlight source with single LED package.

Optionally, the step S2 of periodically reciprocating the backlight source with single lamp package is periodically reciprocating the backlight source with single lamp package along a long edge direction of the backlight module.

Wherein the backlight source with single lamp package is a symmetric light source.

Wherein the backlight source with single lamp package is periodically reciprocated along the long edge direction of the backlight module at a frequency higher than 24 Hz.

Wherein an initial position of a center of the backlight source with single lamp package in the backlight module is located at a center of the backlight module.

Optionally, the step S2 of periodically reciprocating the backlight source with single lamp package is periodically rotating the backlight source with single lamp package using a center position of the backlight module as a rotation axis.

Wherein the backlight source with single lamp package is an asymmetric light source.

Wherein the backlight source with single lamp package is periodically rotated at a frequency higher than 24 Hz using the center position of the backlight module as a rotation axis.

Wherein an initial position of an end point of the backlight source with single lamp package in the backlight module is located at the center of the backlight module.

Beneficial effect of the present invention: the dynamic light mixing method of backlight module of the present invention utilizes the limit resolution time of the human eye to compensate the insufficient light region by periodically reciprocating the backlight source with single lamp package. Each time the backlight source with single lamp package completes a reciprocating movement, the light-emitting region sweeps through the entire light-emitting surface of the backlight module once, and the period of the reciprocating movement is smaller than the time resolution of the human eye, so that the light emitted by the backlight source with single lamp package can achieve an uniform light mixing in the reaction time of the human eye, and meet the requirements of the optical uniformity of the entire backlight module.

BRIEF DESCRIPTION OF THE DRAWINGS

In order to further understand the features and technical contents of the present invention, please refer to the following detailed description of the invention and the accompanying drawings. However, the drawings are provided for purposes of illustration and description only and are not intended to be limiting.

In the figures.

DETAILED DESCRIPTION OF PREFERRED EMBODIMENTS

In order to further clarify the technical means and effects of the present invention, the following detailed description will combine with the preferred embodiments of the invention and the accompanying drawings.

Figure 1:
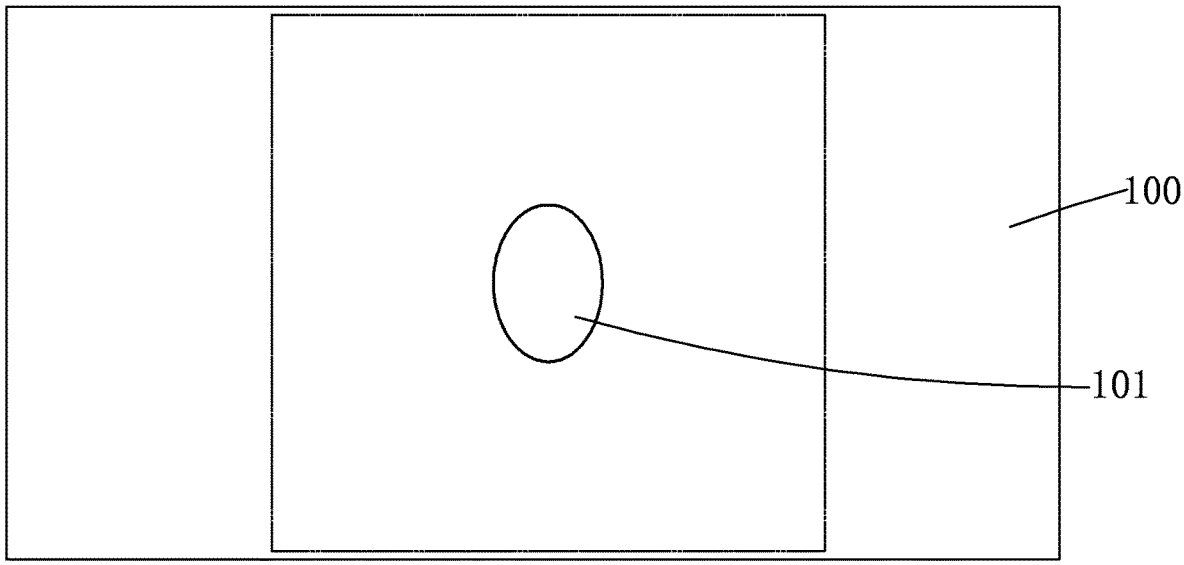
FIG. 1 is a front view of a conventional backlight module of a backlight source using a symmetrical single LED package.
Figure 2:
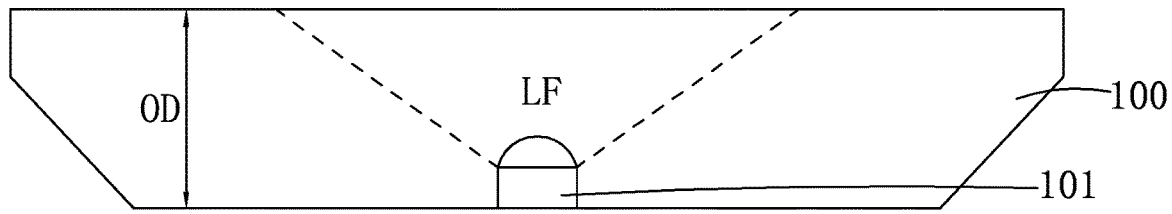
FIG. 2 is a top plan view of a conventional backlight module of a backlight source using a symmetrical single LED package.
Figure 3:
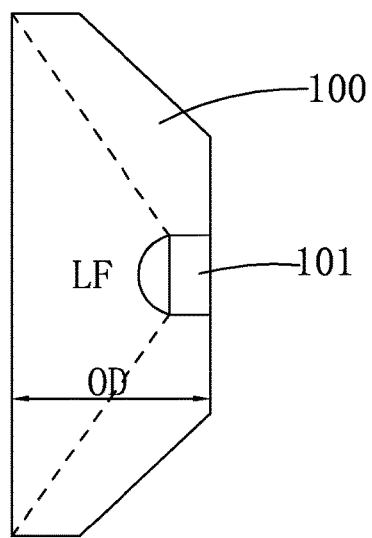
FIG. 3 is a right side view of a conventional backlight module of a backlight source using a symmetrical single LED package.
Figure 4:
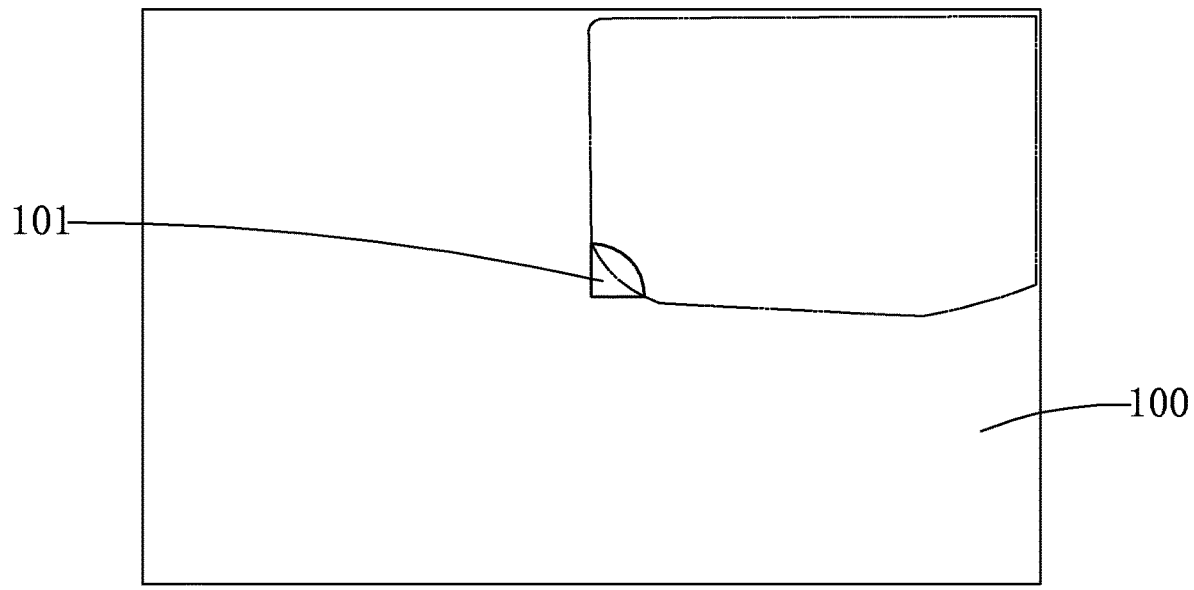
FIG. 4 is a front view of a conventional backlight module of a backlight source using an asymmetric single LED package.
Figure 5:
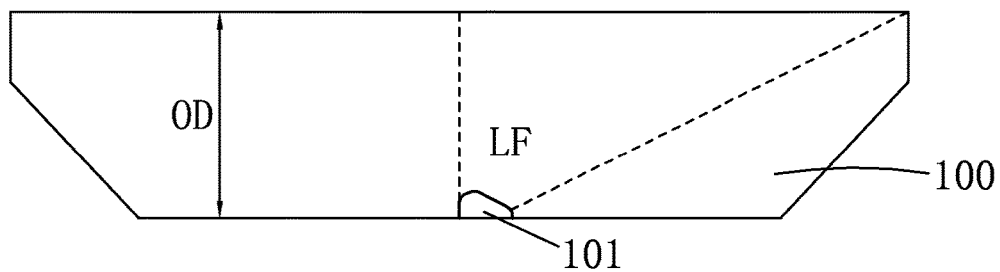
FIG. 5 is a top plan view of a conventional backlight module of a backlight source using an asymmetric single LED package.
Figure 6:
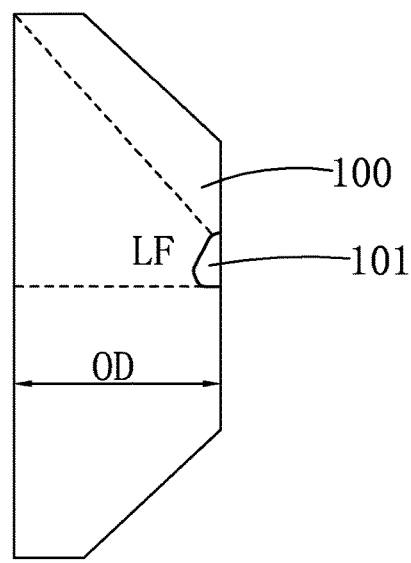
FIG. 6 is a right side view of a conventional backlight module of a backlight source using an asymmetric single LED package.
Figure 7:
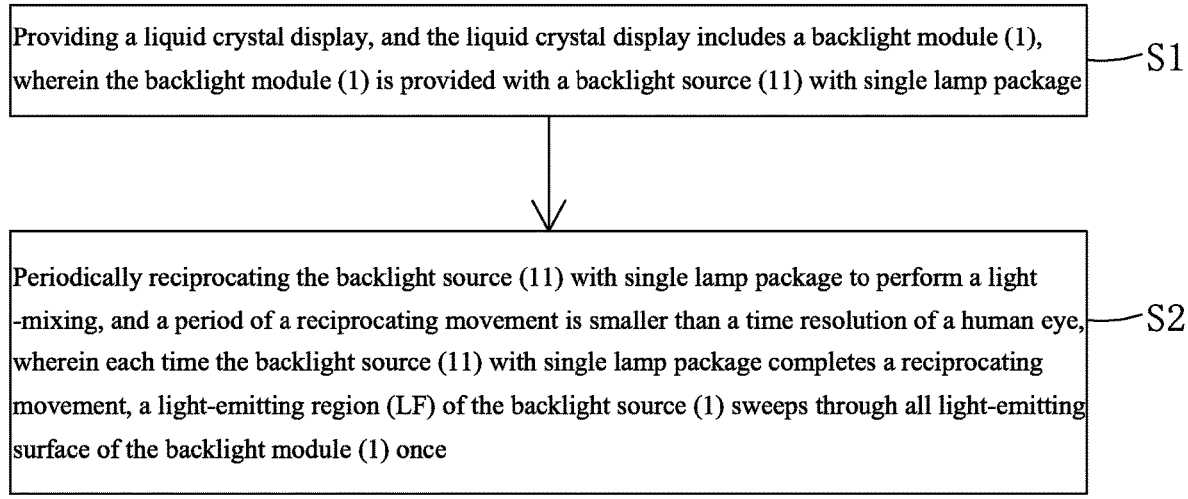
FIG. 7 is a flow chart of a dynamically light-mixing method of backlight module of the present invention.
Figure 8:
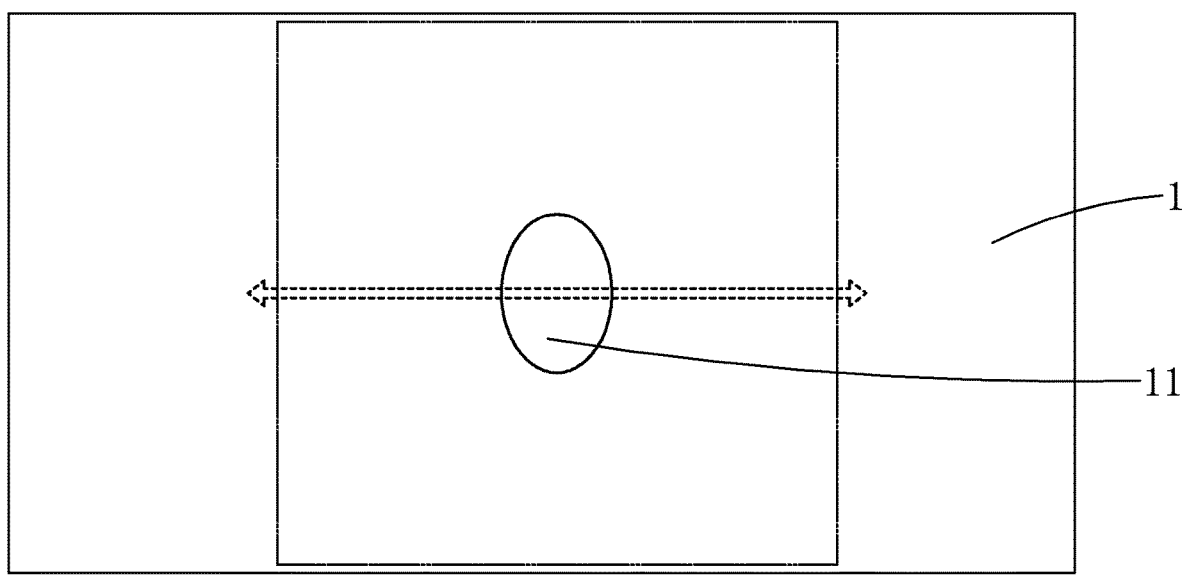
FIG. 8 is a front view of a dynamically light-mixing method of backlight module according to a first embodiment of the present invention.
Figure 9:
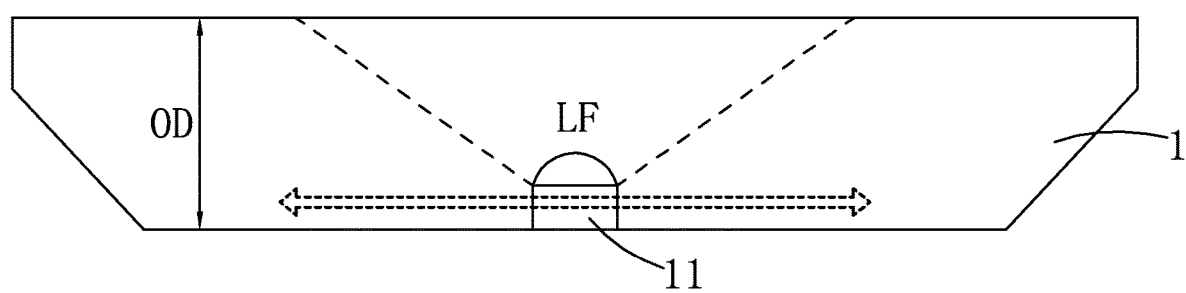
FIG. 9 is a top plan view of a dynamically light-mixing method of backlight module according to a first embodiment of the present invention.

Referring to FIG. 7, in combining with FIG. 8 and FIG. 9, the first embodiment of dynamic light-mixing method of backlight module of the present invention includes the following steps:

In step S1, providing a liquid crystal display, and the liquid crystal display includes a backlight module 1, wherein the backlight module 1 is provided with a backlight source 11 with single lamp package.

Specifically, the backlight source 11 with single lamp package is preferably a backlight source 11 with single LED package.

Furthermore, in the first embodiment, the backlight source with single lamp package is a symmetric light source (the so-called symmetric light source means that a projection pattern of the light-emitting region LF of the light source satisfies an axisymmetric relationship in a three-view drawing).

Step S2, periodically reciprocating the backlight source 11 with single lamp package along a long edge direction of the backlight module 1 to perform a light-mixing, and a period of a reciprocating movement is smaller than a time resolution of a human eye. In other words, a frequency of the reciprocating movement is greater than a resolution frequency of the human eye, that is, the reciprocating movement is completed within a limit resolution time of the human eye, and the human eye cannot detect the movement of the backlight source 11 with single lamp package.

Combining with FIG. 8 and FIG. 9, although the light-emitting region LF of the backlight source 11 with single lamp package is limited, in the static state, only the short edge direction of the backlight module 1 can satisfy the requirement of optical uniformity. In the long edge direction of the backlight module 1 only a portion of the region can satisfy the requirement of optical uniformity (the portion indicated by the double-dash line frame in FIG. 8). However, the step S2 of periodically reciprocating the backlight source 11 with single lamp package along a long edge direction of the backlight module 1 to perform a light-mixing can compensate the insufficient light region.

Each time the backlight source 11 with single lamp package completes a reciprocating movement, a light-emitting region LF of the backlight source sweeps through all light-emitting surface of the backlight module 1 once, and the frequency of the reciprocating movement is higher than the resolution frequency of the human eye such that the movement of the backlight source 11 of the single lamp package is not detected by the human eye, so that the light emitted by the backlight source 11 with single lamp package can achieve uniform light mixing in the reaction time of the human eye. Accordingly, even in the case that the light-mixing distance OD of the backlight module 1 is lower, the optical uniformity of the backlight can also be achieved, and the optical uniformity of the entire backlight module can be satisfied.

Specifically, the backlight source 11 with single lamp package is periodically reciprocated along the long edge direction of the backlight module 1 at a frequency higher than 24 Hz.

Preferably, an initial position of a center of the backlight source 11 with single lamp package in the backlight module 1 is located at a center of the backlight module 1.

Figure 10:
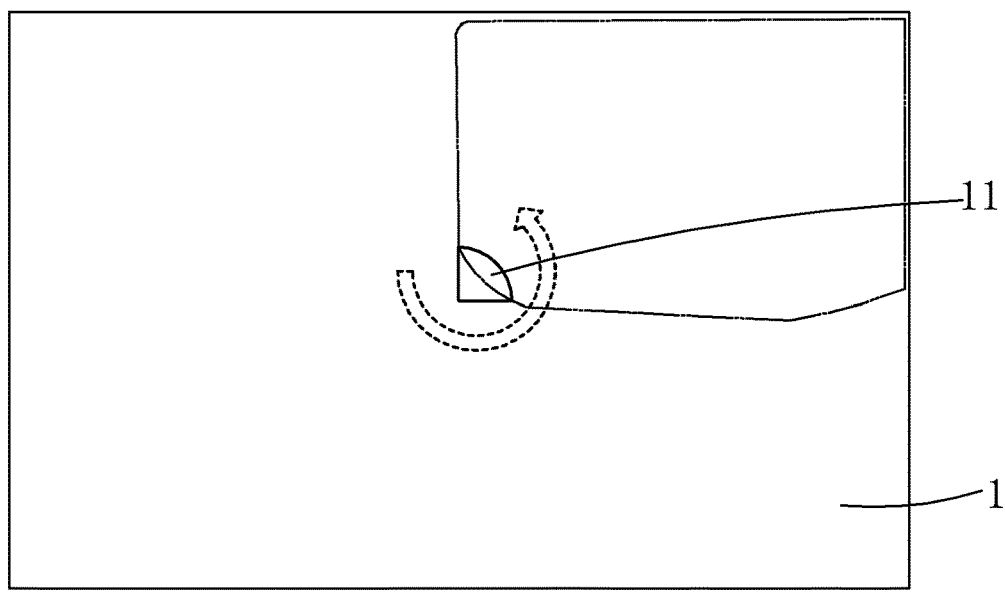
FIG. 10 is a front view of a dynamically light-mixing method of backlight module according to a second embodiment of the present invention.
Figure 11:
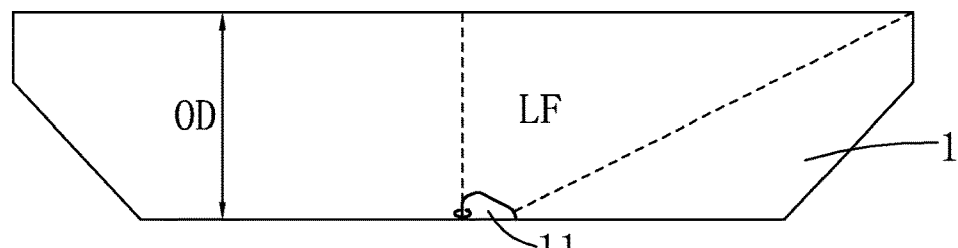
FIG. 11 is a top plan view of a dynamically light-mixing method of backlight module according to a second embodiment of the present invention.
Figure 12:
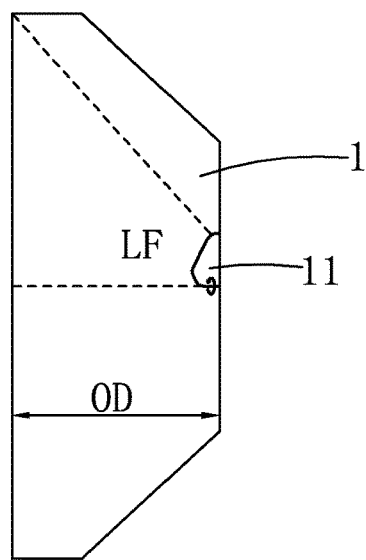
FIG. 12 is a right side view of a dynamically light-mixing method of backlight module according to a second embodiment of the present invention.

Referring to FIG. 7, in combining with FIG. 10 to FIG. 12, a second embodiment of a dynamic light mixing method of backlight module of the present invention includes the following steps:

In step S1, providing a liquid crystal display, and the liquid crystal display includes a backlight module 1, wherein the backlight module 1 is provided with a backlight source 11 with single lamp package.

Specifically, the backlight source 11 with single lamp package is preferably a backlight source 11 with single LED package.

Furthermore, in the second embodiment, the backlight source with single lamp package is an asymmetric light source (the so-called asymmetric light source means that a projection pattern of the light-emitting region LF of the light source does not satisfy an axisymmetric relationship in a three-view drawing).

Step S2, periodically rotating the backlight source 11 with single lamp package using a center position of the backlight module 1 as a rotation axis, and a rotation period is shorter than a time resolution of the human eye, in other words, the rotation frequency is higher than a resolution frequency of the human eye, that is, one rotation is completed within the limit resolution time of the human eye, the human eye does not detect that the backlight source 11 with single lamp package is rotating.

Specifically, the backlight module 1 may be provided with a driving device (for example, a motor) connected to the backlight source 11 with single lamp package to drive the backlight source 11 with single lamp package to periodically rotate using the center of the backlight module 1 as a rotation axis, and a rotation frequency of the driving device is higher than the resolution frequency of the human eye. The driving device may be disposed outside or inside the backlight module 1.

Combining with FIG. 10 to FIG. 12, although the light-emitting region LF of the backlight source 11 with single lamp package is limited, under a static condition, only the backlight of the upper right portion of the backlight module 1, similar to a fan-shaped region (double-dotted line frame in FIG. 10), is uniform. However, in the step S2, periodically rotating the backlight source 11 with single lamp package using a center position of the backlight module 1 as a rotation axis to perform a light-mixing can compensate an insufficient light region.

Each time the backlight source 11 with single lamp package is rotated, the light-emitting region LF sweeps through all light-emitting surface of the backlight module 1 once, and the rotation frequency is higher than the resolution frequency of the human eye, and the human eye cannot detect the rotation of the backlight source 11 with single lamp package, which enables the light emitted by the backlight source 11 with single lamp to achieve an uniform light-mixing effect in the reaction time of the human eye, and even the light-mixing distance OD of the backlight module 1 is low, the optical uniformity of the backlight can be achieved, and the optical uniformity of the entire backlight module can be satisfied.

Specifically, the backlight source 11 with single lamp package is periodically rotated at a frequency higher than 24 Hz using the center position of the backlight module 1 as a rotation axis.

Preferably, an initial position of an end point of the backlight source 11 with single lamp package in the backlight module 1 is located at the center of the backlight module 1, and the backlight source 11 with single lamp package is periodically rotated around the end point.

In summary, the dynamic light mixing method of backlight module of the present invention utilizes the limit resolution time of the human eye to compensate the insufficient light region by periodically reciprocating the backlight source with single lamp package. Each time the backlight source with single lamp package completes a reciprocating movement, the light-emitting region sweeps through the entire light-emitting surface of the backlight module once, and the period of the reciprocating movement is smaller than the time resolution of the human eye, so that the light emitted by the backlight source with single lamp package can achieve an uniform light mixing in the reaction time of the human eye, and meet the requirements of the optical uniformity of the entire backlight module.

In the above, various other changes and modifications can be made in accordance with the technical solutions and technical concept of the present invention, and all such changes and modifications should still be protected by the claims of the present invention.

What is claimed is:

1. A dynamic light-mixing method of backlight module, comprising steps of:
   step S1: providing a liquid crystal display, and the liquid crystal display includes a backlight module, wherein the backlight module is provided with a backlight source with single lamp package;
   step S2: periodically reciprocating the backlight source with single lamp package to perform a light-mixing, and a period of a reciprocating movement is smaller than a time resolution of a human eye;
   wherein each time the backlight source with single lamp package completes a reciprocating movement, a light-emitting region of the backlight source sweeps through all light-emitting surface of the backlight module once;
   wherein the step S2 of periodically reciprocating the backlight source with single lamp package is periodically rotating the backlight source with single lamp package using a center position of the backlight module as a rotation axis.

2. The dynamic light-mixing method of backlight module according to claim 1, wherein the backlight source with single lamp package is a backlight source with single LED package.

3. The dynamic light-mixing method of backlight module according to claim 1, wherein the backlight source with single lamp package is an asymmetric light source.

4. The dynamic light-mixing method of backlight module according to claim 1, wherein the backlight source with single lamp package is periodically rotated at a frequency higher than 24 Hz using the center position of the backlight module as a rotation axis.

5. The dynamic light-mixing method of backlight module according to claim 3, wherein an initial position of an end point of the backlight source with single lamp package in the backlight module is located at the center of the backlight module.

* * * * *